United States Patent [19]

Philips

[11] Patent Number: 4,826,322

[45] Date of Patent: May 2, 1989

[54] ENCAPSULATED MOTION TRANSDUCER

[76] Inventor: Gerald J. Philips, 1168 St. George Dr., Annapolis, Md. 21401

[21] Appl. No.: 886,827

[22] Filed: Jul. 18, 1986

[51] Int. Cl.⁴ ............................................. G01B 11/14
[52] U.S. Cl. ...................................... 356/373; 73/655
[58] Field of Search ................ 356/373, 375; 250/227; 33/556, 559, 561, 558; 73/665, 661

[56]    References Cited
U.S. PATENT DOCUMENTS 3,847,015  12/1974  Blatter ..................................... 73/661

Primary Examiner—R. A. Rosenberger
Assistant Examiner—Crystal Cooper
Attorney, Agent, or Firm—Foley & Lardner, Schwartz, Jeffery, Schwaab, Mack, Blumenthal & Evans

[57]    ABSTRACT

A transducer system for detecting and measuring the displacement and/or vibration of objects placed in contact therewith. The system includes a reflective target for reflecting incident light and vibrating in unison with a contacted object. Fiber optics guide light from a light source to the target via a light coupling medium, and back to a signal generator. A truncated spherical member, providing the target and the object contacting surface, is biased by Belleville springs. The light guiding fiber optics, springs and light coupling medium are sealed from the hostile environment of the transducer.

3 Claims, 4 Drawing Sheets

ENCAPSULATED MOTION TRANSDUCER

BACKGROUND OF THE INVENTION

1. Field of the Invention

The invention relates to an encapsulated motion transducer, and more particularly to a transducer for measuring displacement and very small amplitude vibrations in hostile environmental conditions such as grease, oil, metallic sludge, corrosion, high ambient vibration, high temperature, electrical, and electromagnetic interference.

2. Related Art

Fiber optic devices for the detection and measurement of displacement and vibration have been disclosed by U.S. Pat. No. 3,273,447 to Frank and by U.S. Pat. No. 3,327,584 to Kissinger. The output of devices attributable to Kissinger, which have been commercially marketed, are proportional to target surface motion as well as target surface reflectivity. To sense and measure motion precisely with these devices it is necessary to ensure that the target surface reflectivity is constant while measurements are being taken.

It has been found that accurate dynamic measurements can not be made with unencapsulated fiber optic devices in environments where there is contamination of the target surface or of the optical path to the target surface. Other non-contact motion transducers, such as eddy current or capacitive types also suffer a degradation of performance when used in an environment that causes metallic based contamination to collect at the sensing tip. For example when using these unencapsulated devices to monitor bearing vibration in the manner disclosed in U.S. Pat. No. 4,196,629 (which is hereby incorporated by reference), it was found that bearings corrode in their housings and that bearing lubricant migrates towards the sensing area mixing with the corrosion products as it migrates. The mixing of corrosion products and lubricant creates a metallic sludge that degrades the performance of any transducer that is sensitive to metallic substances or is dependent upon a clear optical path to the target.

A surface-contacting fiber optic displacement transducer has been disclosed by Philips in copending application Ser. No. 748,084, filed Sept. 24, 1985, and is designed to overcome work surface reflectivity problems by encapsulating the fiber optic sensor tip. The elastomeric biasing means of those devices have been found to create distortions in the frequency response of light that is reflected from the sensing means reflective surface. A typical frequency response of the device using elastomeric biasing is shown in FIG. 1. The desired frequency response is a straight line as indicated on the figure. Distortions of the type shown in FIG. 1 significantly degrade the capacity of these devices to provide precise motion measurements at all frequencies of vibration. Furthermore, to minimize the amount of distortion, the force generated by the elastomeric biasing means must be kept very small. Thus, intimate contact between sensor means and target surface can not be maintained with these devices when vibrations are present which generate acceleration forces on the sensor tip which exceed the small elastomeric spring force. A loss of intimate contact can occur when the target vibrates excessively or when the device is installed in a moving vehicle that is subject to large accelerations.

The elastomeric biasing means disclosed in the above application has a restricted amount of motion that is 0.003 inches or only slightly more. This restriction prohibits the setting of an operational gap at what is known as the optical peak in the response curve of the devices attributable to Kissinger. The optical peak, a typical example of which is indicated in FIG. 2, is the region at the peak of the output curve where changes in the amplitude of reflected light are proportional only to target surface reflectivity changes and not to gap changes. The optical peak is thus the only point at which reflectivity of a target surface can be accurately and reliably checked for its absolute value. This is important because reflective surfaces can oxidize or otherwise degrade over a period of time, especially when subjected to elevated temperatures. The restricted range of motion of the device in the application also markedly increases the sensitivity of the device to installation errors thereby rendering the device much less practical to employ.

Many bearings are subject to extremes of operating temperatures. An example of this application would be small high speed turbomachinery with bearings located close to hot turbines. Normal bearing operating temperatures run up to 400 F. Mildly elevated temperatures are considered to be in the range 400–600 F. A limited number of special bearing applications extend to 1000 F and even higher. The above application does not provide considerations for operation at elevated temperatures.

Electrical noise and electromagnetic interference are problems frequently encountered with electrical sensing devices. These interferences are particularly troublesome when very low amplitude vibrations are to be measured. In the device disclosed by U.S. Pat. No. 4,196,629 to Philips low amplitude bearing vibrations are sensed and converted to bearing noise levels. That noise level reading is degraded when the sensing instrument self-noise and/or ambient noise interfere with the motion sensing device.

A prior displacement probe is illustrated in U.S. Pat. No. 4,171,645 to Miserentino, et al which includes a target in the form of a ball or planar member. The target is held in contact with a vibrating surface by gravity, a set of springs, a balloon device or a jet spray of gas. However, the Miserentino, et al probe lacks means for sealing the transducer elements from hostile environmental interferences, lacks material means for achieving successful operation at elevated temperatures, lacks coupling means to maximize the amount of light throughput, lacks means for overcoming ambient and self-generated noise, and it lacks a method for maintaining sensor contact with test objects in hostile vibration environments.

Other types of non-contact motion transducers that do not use light sensing means are also available commercially. Of those, eddy-current and capacitance sensing devices are very common. These devices are not sensitive to target surface reflectivity variations but their usefullness in hostile environmental conditions is significantly degraded by metallic contamination, by elevated temperatures, and by electrical and eletromagnetic interferences.

SUMMARY OF THE INVENTION

The invention overcomes hostile environmental interference problems, optical path fouling, and metallic debris contamination problems by encapsulating the motion transducer sensing means and sealing it from outside sources of contamination. Further, this invention is operable at elevated temperatures with proper selection of suitable materials. Furthermore, this invention resolves very small amplitude high frequency vibrations by providing a highly reflective target surface and by providing coupling means to maximize the transfer of light through the internal elements of the sensor. Additionally, this invention markedly improves the signal to noise ratio of optical sensing devices of the Kissinger type by using pulsed light sources.

It is a primary objective of this invention to provide an encapsulated fiber optic motion transducer which eliminates hostile environmental interference and optical path fouling problems.

Another purpose of this invention is to provide an encapsulated fiber optic motion transducer which maintains intimate contact with a vibrating target at all times.

Another important purpose of this invention is to provide an encapsulated motion transducer that is not affected by physical environment or atmospheric problems such as contamination of the sensing path by gaseous, liquid or solid substances.

Yet another purpose of this invention is to provide an encapsulated motion transducer having a flat frequency response from DC to any higher frequency desired which response can be calculated and controlled by design.

Still another feature of this invention is the provision of an encapsulated fiber optic motion transducer using pulsed light sources to improve sensor signal to noise ratio.

Still yet another feature of this invention is the provision of an encapsulated motion transducer with means for checking sensor light path degradation without requiring sensor disassembly.

A further feature of this invention is the provision of an encapsulated fiber optic motion transducer using single fibers instead of bundled fibers.

Yet another feature of this invention is to maximize the intensity of light throughput of the sensor.

Still another feature of this invention is the provision of an encapsulated motion transducer for operation at elevated temperatures.

A transducer system detects and measures the displacement and/or vibration of objects placed in contact therewith. The system includes a reflective target for reflecting incident light and vibrating in unison with a contacted object. Fiber optics guide light from a light source to the target, via a light coupling medium, and back to a light generating means. A truncated spherical member, providing the target and the object contacting surface, is biased by Belleville springs. The light guiding fiber optics, springs and light coupling medium are sealed from the hostile environment of the transducer.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings wherein.

DESCRIPTION OF THE PREFERRED EMBODIMENT

Figure 1:
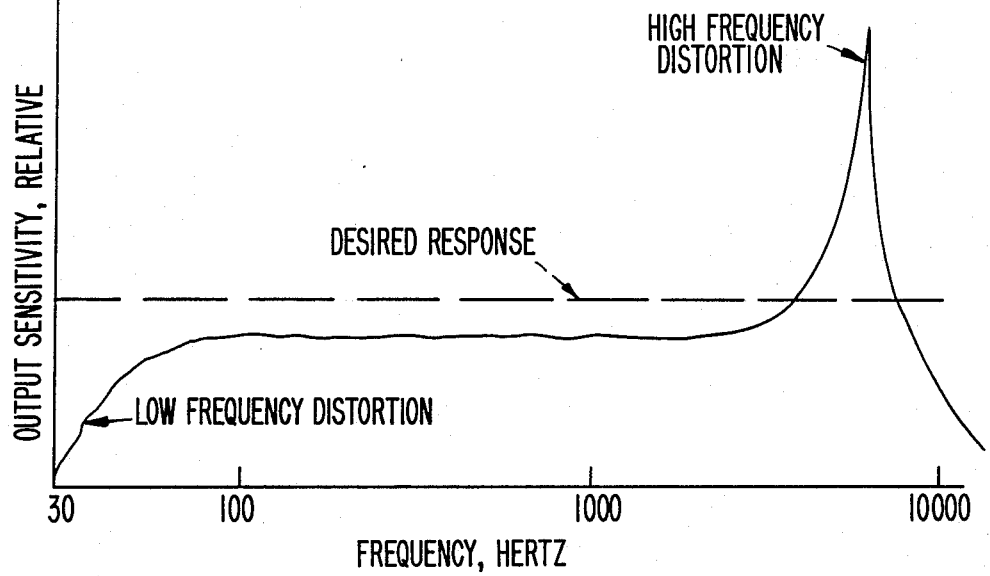
FIG. 1 is a typical frequency response curve using elastomeric biasing.

Referring now to the drawings, like reference characters designate identical or corresponding parts throughout the several views.

Figure 3A:
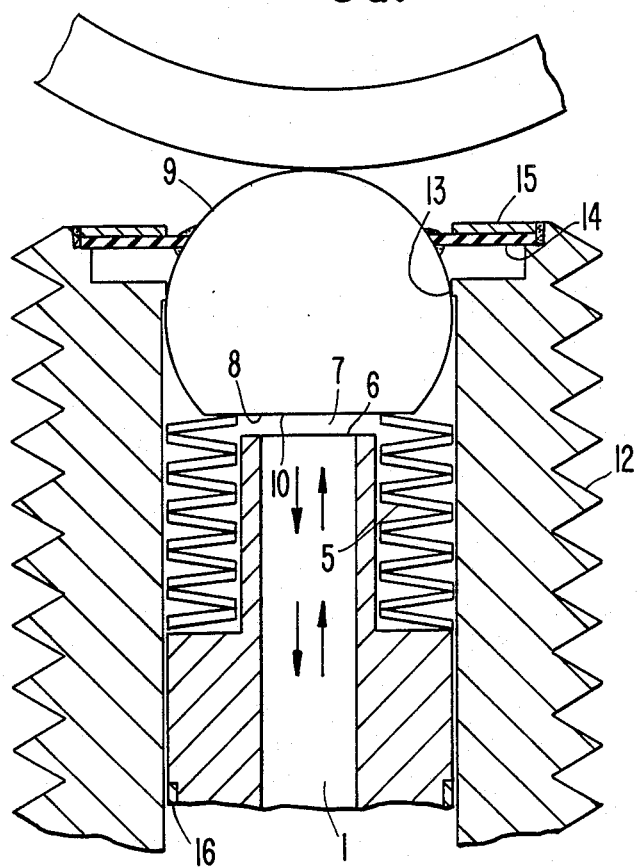
FIG. 3a shows the encapsulated end of the invention isolated and in cross-section.
Figure 3:
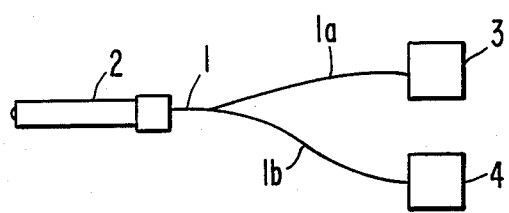
FIG. 3 shows a first embodiment of the invention.

Referring to FIG. 3, numeral 1 designates a plurality of fiber optic light guides which are mounted inside of an encapsulator 2 at one end and which are bifurcated at the opposite end into two groups 1a and 1b where light source means 3 and light detector means 4 are provided. The light source means 3 provides continuous illumination of either visible or invisible light to the fiber optic light guides 1a. The detector means 4 is sensitive to the intensity of light that is returned through the fiber optic light guides 1b.

Referring to FIG. 3a which shows the sensing end of the encapsulator in cross-section, the fiber optic light guides 1 are shown bounded by a rigid sheathing which is so configured to provide support for a plurality of spring elements in the form of stainless steel Belleville springs 5. The fiber optic light guides 1 are divided into a plurality of conventional groups, at least one group 1a constituting light transmitting fiber optics and at least another group 1b constituting light receiving fiber optics. The fiber optics of both groups merge to form a substantially unitary peripheral surface which is truncated to form a substantially planar surface 6.

A media 7 surrounding the fiber optic probe 1 can be air or it can be filled with a liquid, gas such as an inert gas, vacuum or elastomeric solid material so as to improve the transmission of light and to retard oxidation or other degradation of a reflective target surface 8. The liquid medium and the elastomeric solid medium have an index of refraction equal to or substantially equal to the index of refraction of the light guide means. The reflective target surface 8 is a highly polished surface on a sapphire transducer tip 9 or other material having a density and wear resistance similar thereto. A highly reflective coating 10 is applied to the polished target surface 8. The transducer tip 9 provides contact with a test object 11, the motion of which is to be determined.

In the present configuration the fiber optic light guides 1, spring elements 5, and tip 9 are housed in a stainless steel casing 12 and sealed at both ends from outside contamination. At the sensing end, a shoulder 13 is provided to retain the transducer tip 9 within the transducer casing 12 in the absence of physical contact with the test object 11. During assembly of the transducer the spring elements 5 are forced into compression. A flexible seal 14 of silicone rubber or other similar material designed to tolerate high temperatures is shown which is fixidly attached to the tip 9 and also to the casing 12. The seal provides for the retention of the light conducting media 7 within the transducer and prevention from migration of outside contaminants to the inside of the transducer. A protective cover 15 is provided which is fixidly attached to the casing 12. At the other end of the casing 12, rigid sealing means 16 are provided between the fiber optic probe 1 and the casing 12.

In the design of the transducer, to ensure intimate contact of the tip 9 with the test object 11, the mass of the tip 9 and the springs 5 and the force provided by the springs are determined by calculation so that the spring force always exceeds the forces due to acceleration of the tip mass 9 and the spring mass 5 under any encountered operating condition.

Figure 2:
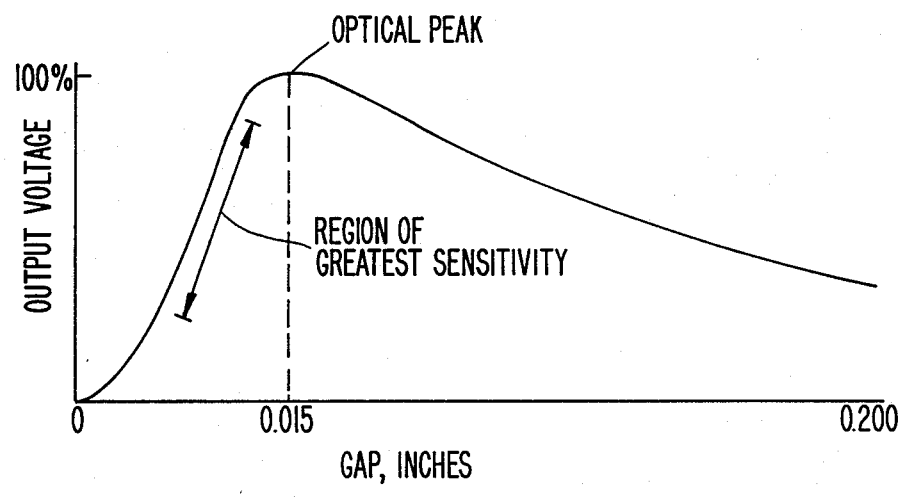
FIG. 2 is a curve comparing output voltage to gap size.

In assembly of the transducer, the gap between the sensing surface 6 and the reflective target surface 8 is set at the optical peak of the response curve which is shown in FIG. 2. This gap set allows for verification of the optical path effectiveness without disassembly of the sensor when the sensor is free of any contact with the test object 11.

In operation, the tip 9 is brought into contact with the test object 11 such that the gap between the sensing surface 6 and the reflective target surface 8 is reduced to the region of greatest sensitivity, which is shown in FIG. 2. Where larger gaps between the sensing surface 6 and the target surface 8 are desired, the assembly can be arranged to set the pre-operational gap at any desired value provided the sealing means 14 can accommodate the additional movement and provided that the spring 5 and tip 9 masses are properly set to maintain intimate contact between the tip 9 and the test object 11 at all dynamic operating conditions.

Figure 4:
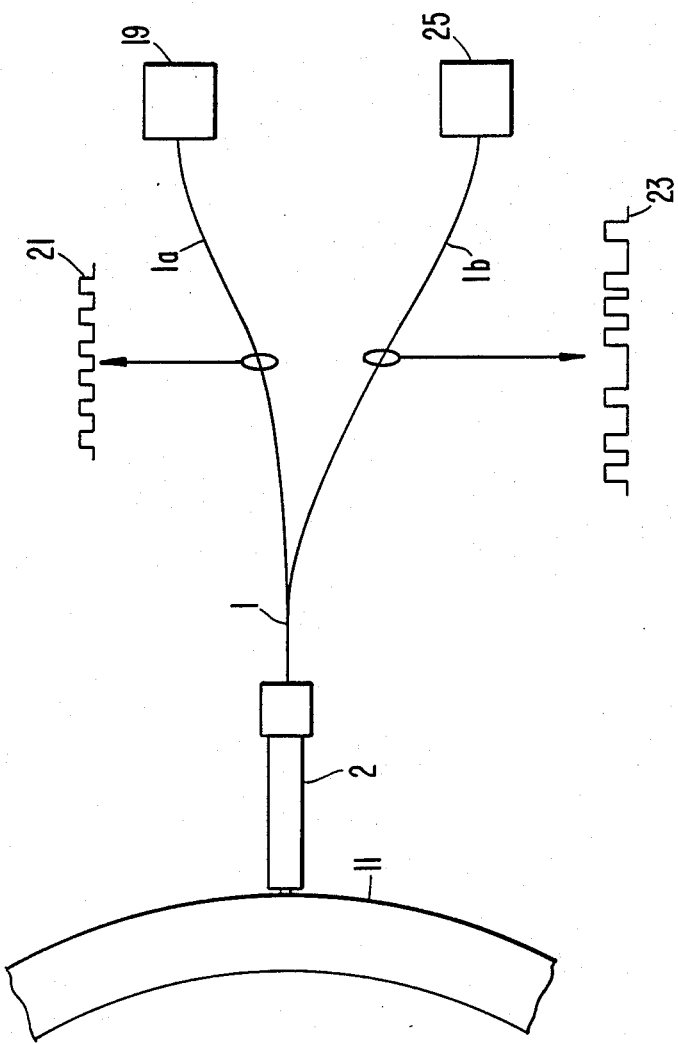
FIG. 4 shows another embodiment of the invention in cross-section wherein the light source is pulsed.

FIG. 4 illustrates an alternative method of using light to detect motion of the reflective target surface 8 within the encapsulator 2. The light source means 19 are pulsed to provide a train of light pulses with regular spacing 21. As the reflective target surface 8 vibrates with test object 11 movement, the incident light pulses are modulated such that the pulse train of reflected light 23 has irregular spacings, the pattern of which is precisely related to the motion of the target surface 8. The detector means 25 convert the spatial irregularities of the pulse train 23 into a signal representative of target motion. In this manner, the dependence upon the intensity of returned light to generate a signal related to motion is eliminated and the signal to noise ratio of the sensor is substantially improved.

Figure 5A:
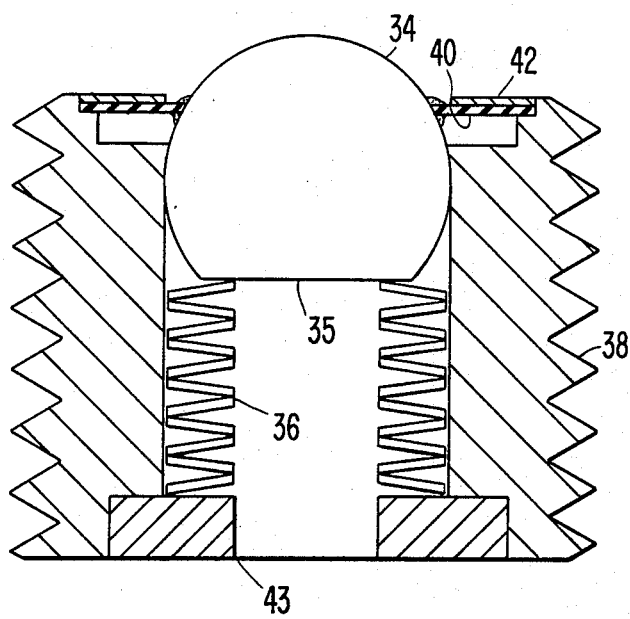
FIG. 5a shows the encapsulator isolated and in cross-section.
Figure 5:
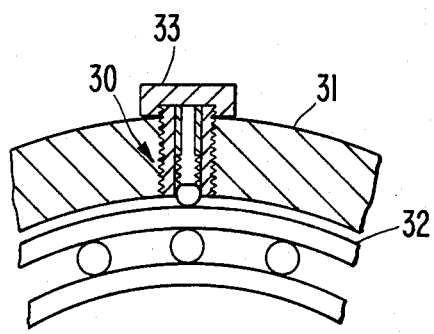
FIG. 5 shows another embodiment of the invention wherein the target means are not mounted to the sensing means.

FIG. 5 illustrates an alternative way of encapsulating the sensing elements with the encapsulator 30. The encapsulator is not mounted on the fiber optic light guides as was the case in FIG. 3. The encapsulator is mounted in a holding device 31 near a test object 32 such that the internal spring elements are sufficiently compressed. A plug cap 33 provides sealing means. As illustrated in FIG. 5a, the encapsulator 30 comprises a tip 34, a reflective target surface 35, spring elements 36, a casing 38, a flexible seal 40 which is fixidly attached to the tip 34 and the casing 38, a protective cover 42 which is fixidly attached to the casing 38, and a spring compressor 43. In this embodiment of the invention the plug cap 33 is removed and the fiber optic probe 1 inserted into the encapsulator 30 when measurements are to be taken. The fiber optic probe 1 is withdrawn from the encapsulator 30 when measurements are not being taken. The plug cap 33 is placed on the encapsulator 30 when the probe 1 is withdrawn.

In summary, the invention overcomes hostile environmental interference problems of non-contact proximity detectors by encapsulating the sensing end of these devices thereby protecting them from outside sources of contamination. In so doing, means are also provided to maximize the transfer of light through the sensor. The tip 9 and the spring elements 5 should be selected so that intimate contact between the tip 9 and the test object 11 is maintained at all times. The proper design can be achieved by considering the accelerations of the environment in which the transducer will be placed. The materials disclosed in this invention should provide for successful operation of the transducer up to 600 F. A pulsed light source can be used to obtain increased signal to noise ratio with bundled fibers or with single fibers.

It will be understood that variations and modifications may be effected without department from the spirit and scope of the novel concepts of this invention.

What is claimed is:

1. A transducer system for the detection and measurement of displacement and vibration of objects placed into contact therewith, comprising:
   (a) a reflective target means for reflecting incident light and for vibrating in unison with a contacted object having a dynamic motion;
   (b) means for guiding transmitted light to and for guiding received reflected light from the reflective target means;
   (c) means for contacting the test object and for supporting the reflective target means;
   (d) means for biasing the contacting means to precisely follow the dynamic motion of the contacted object;
   (e) means for sealing the light guiding means and reflective target means from outside sources of contamination; and
   (f) means for coupling and optimizing the transfer of light between the light guiding means and the reflective means and the reflective target means, wherein the light coupling means is a liquid having an index of refraction equal to or substantially equal to the index of refraction of the light guiding means.

2. A transducer system for the detection and measurement of displacement and vibration of objects placed into contact therewith, comprising:
   (a) a reflective target means for reflecting incident light and for vibrating in unison with a contacted object having a dynamic motion;
   (b) means for guiding transmitted light to and for guiding received reflected light from the reflective target means;
   (c) means for contacting the test object and for supporting the reflective target means;
   (d) means for biasing the contacting means to precisely follow the dynamic motion of the contacted object;
   (e) means for sealing the light guiding means and reflective target means from outside sources of contamination; and
   (f) means for coupling and optimizing the transfer of light between the light guiding means and the reflective target means, wherein the light coupling means is a liquid.

3. A transducer system for the detection and measurement of displacement and vibration of objects placed into contact therewith, comprising:
   (a) a reflective target means for reflecting incident light and for vibrating in unison with a contacted object having a dynamic motion;

(b) means for guiding transmitted light to and for guiding received reflected light from the reflective target means;
(c) means for contacting the test object and for supporting the reflective target means;
(d) means for biasing the contacting means to precisely follow the dynamic motion of the contacted object;
(e) means for sealing the light guiding means and reflective target means from outside sources of contamination; and
(f) means for coupling and optimizing the transfer of light between the light guiding means and the reflective target means, wherein the light coupling means is an elastomeric solid having an index of refraction equal to or substantially equal to the index of refraction of the light guiding means.

* * * * *